US007690617B2

(12) United States Patent
Takao

(10) Patent No.: US 7,690,617 B2
(45) Date of Patent: Apr. 6, 2010

(54) ANTI-TOPPLING BAND AND DISPLAY APPARATUS HAVING ANTI-TOPPLING BAND

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 11/892,100

(22) Filed: Aug. 20, 2007

(65) Prior Publication Data

US 2008/0048075 A1 Feb. 28, 2008

(30) Foreign Application Priority Data

Aug. 22, 2006 (JP) ............................ 2006-225618

(51) Int. Cl.
*B65D 63/00* (2006.01)

(52) U.S. Cl. ...................................... 248/499; 248/500

(58) Field of Classification Search ................. 248/499, 248/501–503, 503.1, 505, 510, 551, 680; 410/96–97; 292/262, 288, 289; 24/170, 24/178–180

See application file for complete search history.

(56) References Cited

U.S. PATENT DOCUMENTS 1,275,578 A * 8/1918 McConahy .................. 24/178
1,828,196 A * 10/1931 McCann ........................ 2/322
4,659,122 A * 4/1987 Miller ........................ 292/262
5,431,365 A * 7/1995 Hopkins ..................... 248/683
6,168,128 B1 * 1/2001 King .......................... 248/499

FOREIGN PATENT DOCUMENTS

| | | |
|---|---|---|
| JP | 06-189813 | 7/1994 |
| JP | 3016236 U | 7/1995 |
| JP | 3082705 U | 10/2001 |
| JP | 2004-291972 | 10/2004 |

* cited by examiner

*Primary Examiner*—Gwendolyn Baxter
(74) *Attorney, Agent, or Firm*—Pillsbury Winthrop Shaw Pittman, LLP

(57) ABSTRACT

According to one embodiment, an anti-toppling band includes a band main body having a flexibility and a plurality of through-holes formed in the band main body and arranged in a longitudinal direction thereof at an interval. The band main body includes a plurality of first portions where the plurality of through-holes are respectively located, and a plurality of second portions located in sections between the plurality of through-holes. The cross sectional area of the plurality of first portions taken along a width direction of the band main body and the cross sectional area of the plurality of second portions taken along a width direction of the band main body are equal to each other.

11 Claims, 5 Drawing Sheets

1
2
6
3
10
5
11
4a
4b
16
22
4
17
20

ANTI-TOPPLING BAND AND DISPLAY APPARATUS HAVING ANTI-TOPPLING BAND

CROSS-REFERENCE TO RELATED APPLICATIONS

This application is based upon and claims the benefit of priority from Japanese Patent Application No. 2006-225618, filed Aug. 22, 2006, the entire contents of which are incorporated herein by reference.

BACKGROUND

1. Field

One embodiment of the present invention relates to an anti-toppling band for preventing, for example, a liquid crystal television set from toppling over, and further to a slim display apparatus such as a liquid crystal television equipped with such an anti-toppling band.

2. Description of the Related Art

Some of the slim television sets such as liquid crystal televisions and plasma televisions are equipped with an anti-toppling band for preventing the slim television from toppling over in case of, for example, earthquake. Examples of such an anti-toppling band is disclosed in, for example, Japanese Utility Model Registration No. 3016236 and Jpn. Pat. Appln. KOKAI Publication No. 2004-291972.

Anti-toppling bands of the above-described type includes a synthetic resin-made band main body that has a flexibility. The band main body has a plurality of through-holes. The through-holes are made for screws for fixing the anti-toppling band to the stand of the slim television or the television base on which the slim television is placed.

The through-holes are arranged in line at constant pitch in the longitudinal direction of the band main body.

In the case of a conventional anti-toppling band, one end of the band main body is fixed via a screw to the stand of the slim television. The screw is put through the through-hole located at the end of the band main body and screwed into the stand. The other end of the band main body is guided from the stand to the television base on which the slim television is placed. The other end of the band main body is fixed via a screw to the stand. The screw is put through the through-hole located at the other end of the band main body and screwed into the stand.

In the case of the conventional anti-toppling band, these through-holes are arranged at a pitch narrow as, for example, 9 mm, so that the anti-toppling band can be easily aligned with respect to the television base. The portions of the band main body where the through-holes are made tend to have a mechanical strength lower than the other portions located between adjacent pairs of the through-holes. In order to compensate for the insufficiency in the mechanical strength, the conventional anti-toppling band is equipped with ribs formed to be continuous in the opening edges of the through-holes in a circumferential direction of each through-holes.

However, when a great number of through-holes are aligned in line at a narrow pitch, it is very difficult to assure a sufficient space to form a rib between an adjacent pair of through-holes, and accordingly, the size of the rib is limited. As a result, when the portion located between an adjacent pair of through-holes is compared with the position where a through-hole is located in terms of the cross sectional area along the width direction of the band main body, the ratio in cross sectional area in one case is 1:0.72. This ratio in cross sectional area is not sufficient for such an occasion where a tensile load is applied to the band main body, and the band main body may break from the location of the respective through-hole.

Further, in the case of the conventional anti-toppling band, the cross sectional area of the portion located between each adjacent pair of through-holes of the band main body is excessive, and as a result, the flexibility of the band is deteriorated. Consequently, it is difficult to bend the band into a desired shape, and thus the ease of use of the anti-toppling band becomes poor.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an anti-toppling band comprises a band main body having a flexibility, and a plurality of through-hole portions formed in the band main body and arranged in a longitudinal direction thereof at an interval, through which a fixing tool is put. The band main body includes a plurality of first portions where the plurality of through-hole portions are respectively located, and a plurality of second portions located in sections between the plurality of through-hole portions, and a cross sectional area of the plurality of first portions taken along a width direction of the band main body and a cross sectional area of the plurality of second portions taken along a width direction of the band main body are equal to each other.

Figure 1:
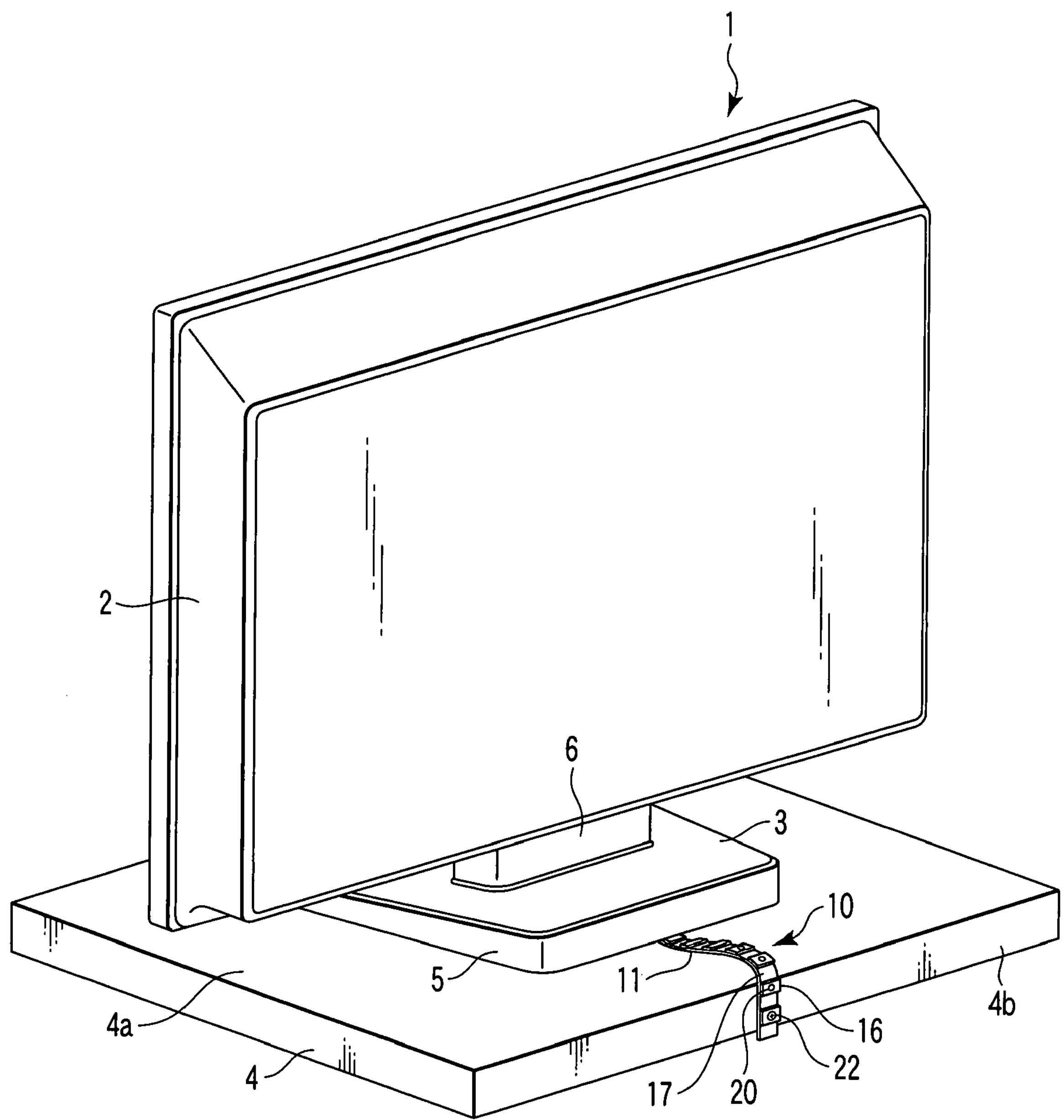
FIG. 1 is an exemplary perspective view illustrating a liquid crystal television is fastened to a television base with an anti-toppling band according to an embodiment of the present invention.

FIG. 1 shows a slim liquid crystal television 1 as an example of the display apparatus. The liquid crystal television 1 includes a display main body 2 and a stand 3.

In the display main body 2, a liquid crystal display panel is housed though it is not illustrated. The stand 3 is designed to support the display main body 2 on a television base 4. The television base 4 is an example of the installation member, and it has a flat upper surface 4*a* and a rear surface 4*b* extending downwards from a rear end of the upper surface 4*a*.

Figure 2:
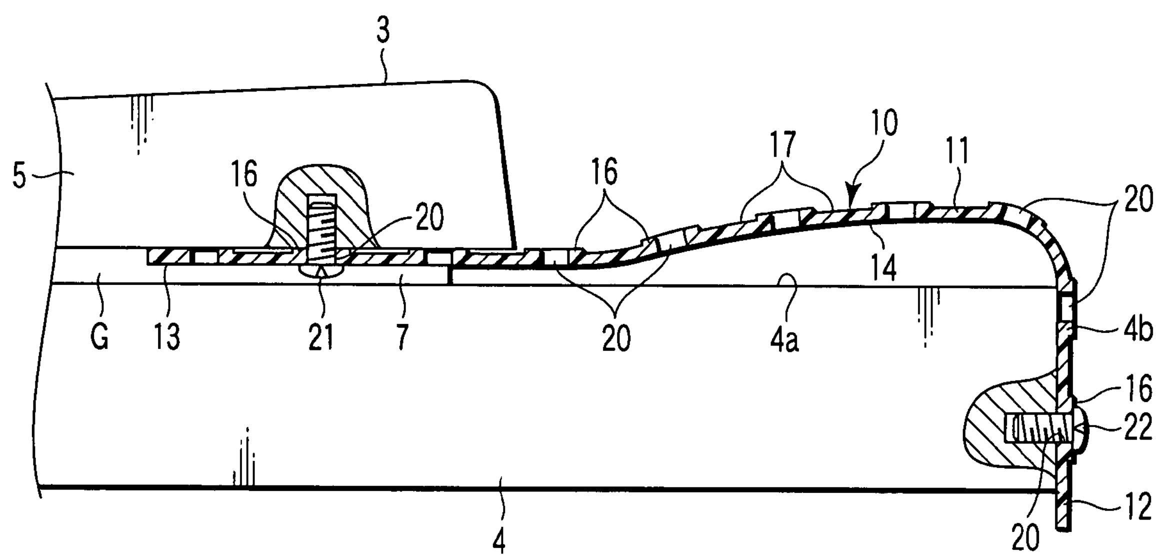
FIG. 2 is an exemplary cross sectional view illustrating the liquid crystal television is fastened to the television base with the anti-toppling band according to the embodiment of the present invention.

The stand 3 includes a flat base 5 to be placed on the upper surface 4*a* of the television base 4. A support 6 is formed at a central portion on the upper surface of the base 5. The support 6 projects upwards from the upper surface of the base 5 and supports the display main body 2. A plurality of rubber-made leg portions 7 (only one of which is illustrated in FIG. 2) are mounted to an outer circumferential portion of the bottom surface of the base 5. The leg portions 7 are set in contact with the upper surface 4*a* of the television base 4. With this structure, a slight gap G corresponding to the thickness of the leg portions 7 is created between the upper surface 4*a* of the television base 4 and the bottom of the base 5.

The liquid crystal television 1 is equipped with an anti-toppling band 10. The anti-toppling band 10 is designed to prevent the liquid crystal television 1 from toppling over in case of, for example, earthquake. The anti-toppling band 10 is put between the stand 3 of the liquid crystal television 1 and the rear surface 4*b* of the television base 4.

Figure 3:
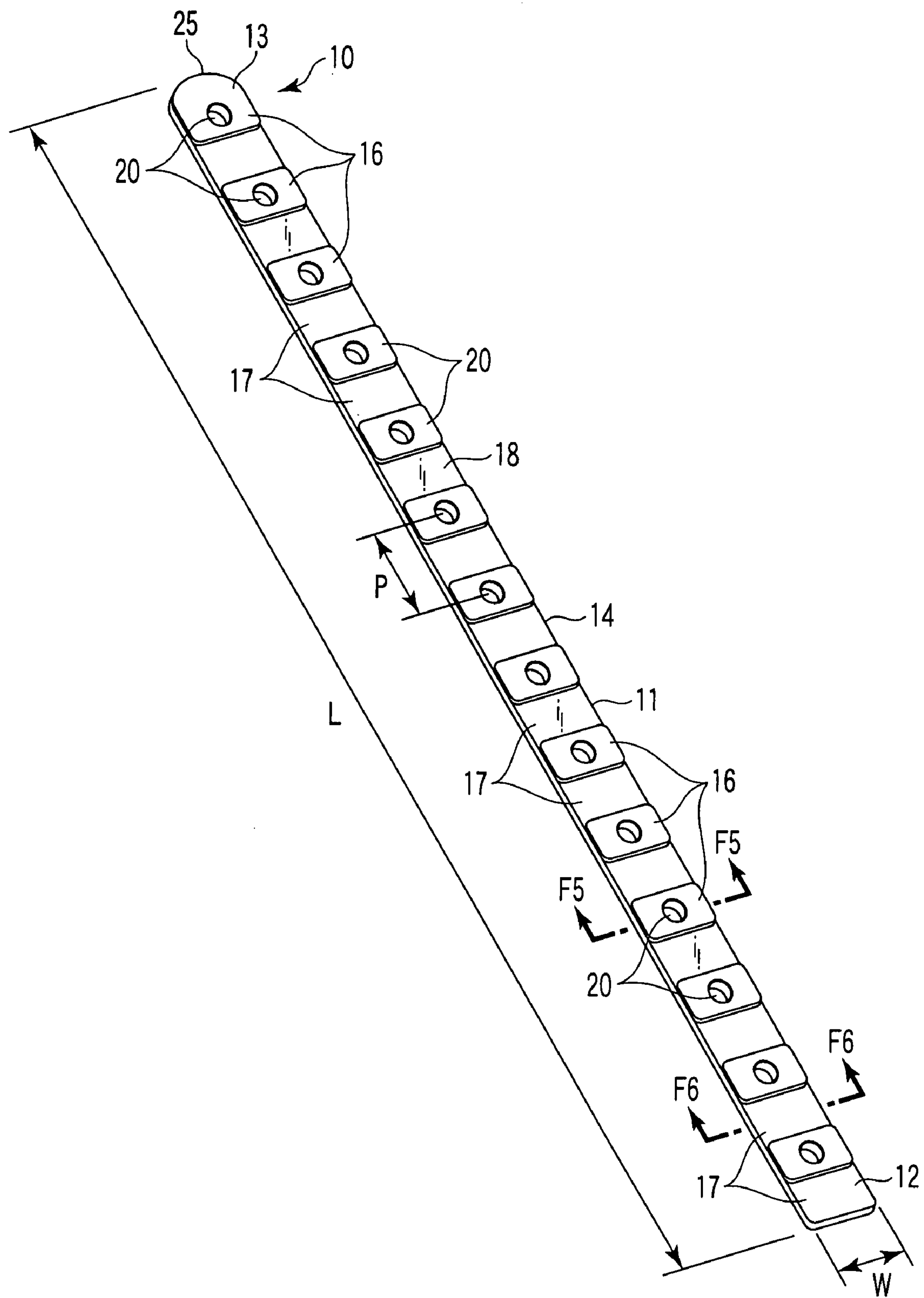
FIG. 3 is an exemplary perspective view of the anti-toppling band according to the embodiment of the present invention.
Figure 4:
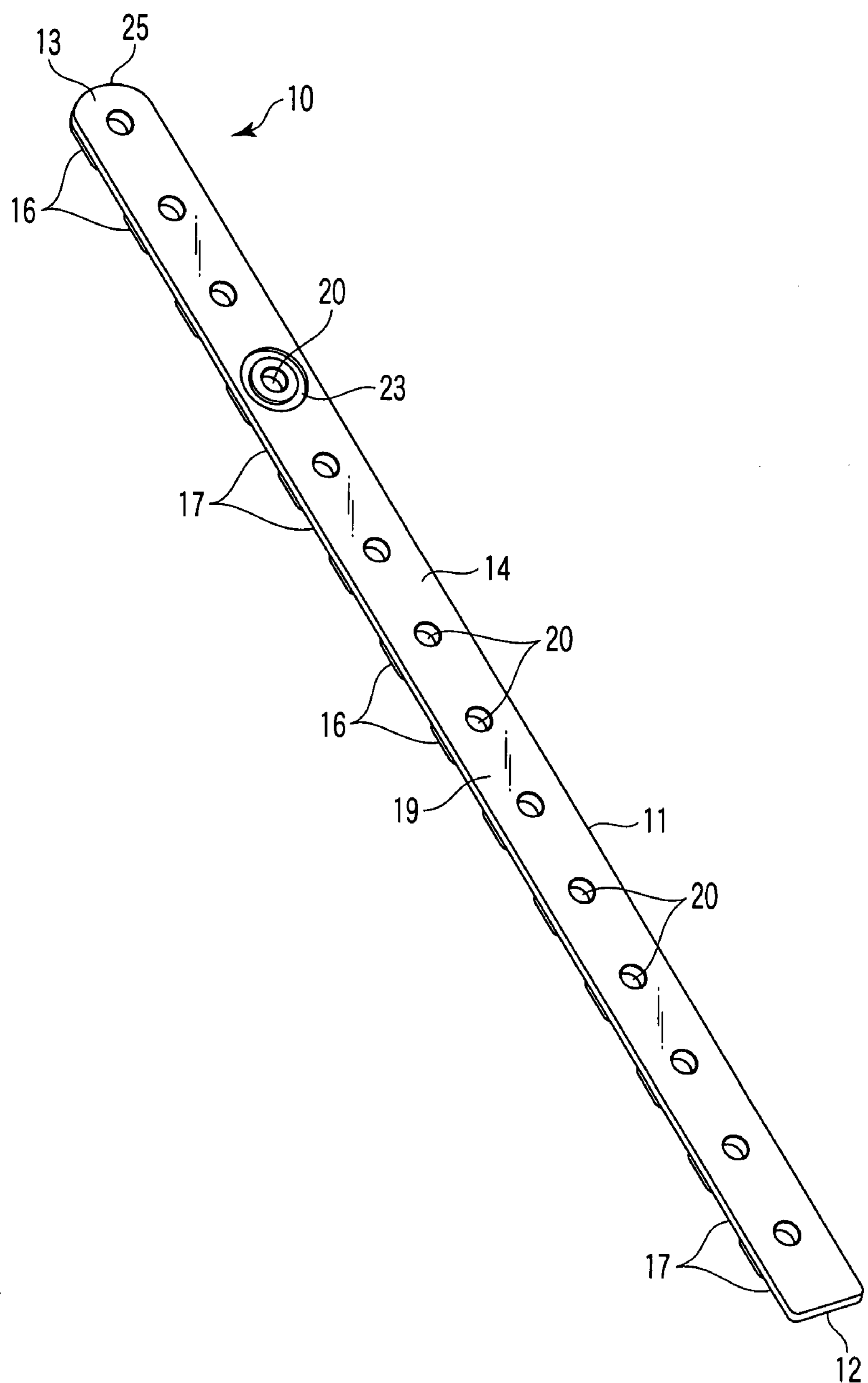
FIG. 4 is an exemplary perspective view of the anti-toppling band according to the embodiment of the present invention taken from a rear side.

As shown in FIGS. 2 to 4, the anti-toppling band 10 includes a band main body 11. The band main body 11 has, for example, a width W of 14 mm and a length L of 255 mm. The band main body 11 includes a first end portion 12, a second end portion 13 and the middle portion 14. The first end portion 12 is located at an end along the longitudinal direction of the band main body 11. The second end portion 13 is located at the other end along the longitudinal direction of the band main body 11. The middle portion 14 is located between the first end portion 12 and the second end portion 13. The band main body 11 is made of a thermoplastic resin material such as nylon, and has such a flexibility that it can be bent freely into various forms.

The band main body 11 includes a plurality of first portions 16 and a plurality of second portions 17. The first portions 16 and the second portions 17 are arranged alternately in the longitudinal direction and in line along the longitudinal direction of the band main body 11.

Figure 5:
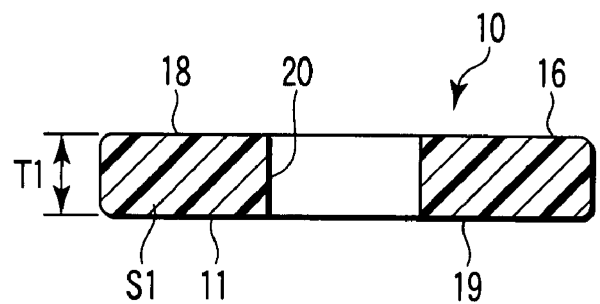
FIG. 5 is an exemplary cross sectional view taken along the line F5-F5 in FIG. 3.
Figure 6:
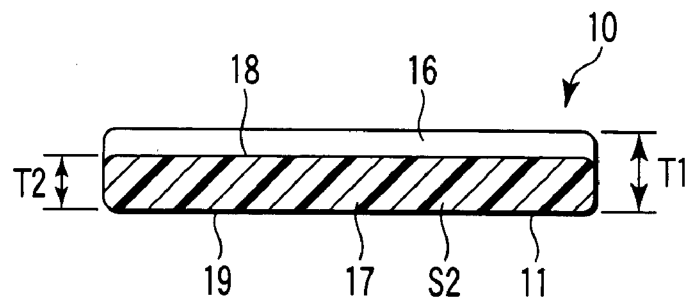
FIG. 6 is an exemplary cross sectional view taken along the line F6-F6 in FIG. 3.

As can be seen in FIGS. 5 and 6, the thickness T1 of the first portions 16 of the main body 11 is larger than the thickness T2 of the second portions 17. In this embodiment, the thickness T1 of the first portions 16 is, for example, 2.2 mm, whereas the thickness T2 of the second portions 17 is, for example, 1.5 mm. With these measurements, the first portions 16 protrude from the second portions 17 by 0.7 mm in the direction of the surface 18 of the band main body 11.

Thus, the surface 18 of the band main body 11 is formed bumpy to have a step at each boundary portion between a first portion 16 and a second portion 17. On the other hand, the reverse surface 19 of the band main body 11 is made flat without any step at each boundary portion between each respective first portion 16 and each respective second portion 17. Further, the second portions 17 of the band main body 11 have a length in the longitudinal direction of the band main body 11 larger than that of the first portions 16.

As shown in FIGS. 3 and 5, a round through-hole 20 is made in the central portion of each first portion 16 as a through-hole portion. A through-hole 20 is designed to put a screw 21 to fix the band main body 11 to the stand 3 of the liquid crystal television 1 and another through-hole 20 is designed to put a screw 22 to fix the band main body 11 to the rear surface 4*b* of the television base 4. The screws 21 and 22 are an example of the fixing tool and they maintain compatibility with each other.

The through-holes 20 are arranged in line along the longitudinal direction of the band main body 11 in such a manner that each adjacent pair of holes are located to interpose the respective second portion 17 of the band main body 11 therebetween. The pitch between each adjacent pair of through-holes 20 is set to, for example, 18 mm, which is larger than the width W of the main body 11.

FIG. 5 shows a cross sectional shape of a first portion 16 of the band main body 11 when it is cut in a width direction of the band main body 11 at a center of the through-hole 20. Similarly, FIG. 6 shows a cross sectional shape of a second portion 17 of the band main body 11 when it is cut in a width direction of the band main body 11. In the anti-toppling band 10 according to this embodiment, when the cross section of the first portion 16 shown in FIG. 5 is expressed by S1 and the cross section of the second portion 17 shown in FIG. 6 is expressed by S2, the relationship of S1=S2 is satisfied. Therefore, the ratio in cross sectional area between the first portion 16 and the second portion 17 of the band main body 11 is 1:1.

In this embodiment, the first end portion 12 of the band main body 11 is formed of a second portion 17, and the second end portion 13 of the band main body 11 is formed of a first portion 16, which includes a through-hole 20.

The anti-toppling band 10 formed described above is fixed to the stand 3 of the liquid crystal television 1 via the screw 21. The screw 21 is put through the through-hole 20 of a particular one of the first portions 16, which is displaced from the middle portion 14 of the main body 11 towards the second end portion 13. In this embodiment, the screw 21 is put through the fourth through-hole 20 from the second end portion 13 and screwed into the bottom of the stand 3.

In order to indicate the position of the through-hole 20 through which the screw 21 is to be put, a recess portion 23 is formed in the reverse surface 19 of the band main body 11 such as to surround the fourth through-hole 20 as shown in FIG. 4. The recess portion 23 is an example of the mark for specifying the fourth through-hole 20, and it is slightly recessed from the reverse surface 19 of the band main body 11.

Due to the presence of the recess portion 23, it is easy to identify the particular one through which the screw 21 should be put out of the through-holes 20. Therefore, the anti-toppling band 10 can be easily set to the stand 3.

The mark for specifying the through-hole 20 through which the screw 21 is to be put is not limited to the recess portion. Alternatively, for example, an arrow may be marked in the reverse surface 19 of the band main body 11 or a sticker may be attached.

In order to fix the anti-toppling band 10 to the television base 4, the band main body 11 is rotated around the crew 21 that fixes the band main body 11 to the stand 3. As the band main body 11 is rotated, the first end portion 12 of the band main body 11 projects out to the rear side of the stand 3 via the gap G between the stand 3 and the television based 4 as shown in FIGS. 1 and 2.

While maintaining this state, the first end portion 12 of the band main body 11 is set to abut against the rear surface 4*b* of the television base 4, and the screw 22 is put through the through-hole 20 located at the first end portion 12. Then, as the screw 22 is screwed into the rear surface 4*b* of the television base 4, the band main body 11 is mounted over between the stand 3 and television base 4.

The band main body 11 of the anti-toppling band 10 is made of a thermoplastic resin material molded into the above-described form. In the forming of the band main body 11, the mold for casting this has a gate at a position corresponding to the first end portion 12 of the band main body 11, through which a molten thermoplastic resin material is injected. The thermoplastic resin material is filled into the mold from the first end portion 12 of the band main body 11 to the second end portion 13. The mold includes a plurality of columnar portions to form the through holes 20. The columnar portions are exposed to a flow path of the thermoplastic resin material formed within the mold.

With the above-described structure, the flow of the thermoplastic resin material in the flow path in the mold diverges into two at a position corresponding to the respective columnar portion. Then, the two flows of the resin material created by the divergence converge in the downstream side of the columnar portion. During this period, the temperature of the thermoplastic resin material flowing in the mold becomes lower as it moves towards the downstream end corresponding to the second end portion 13 of the band main body 11. When the temperature of the thermoplastic resin material becomes low, the flowability of the resin material is deteriorated. Therefore, at a position corresponding to the second end portion 13 of the band main body 11, where the flows of the rein material diverged at the respective columnar portion should converge, the mixing property of the thermoplastic resin material is low.

Figure 7:
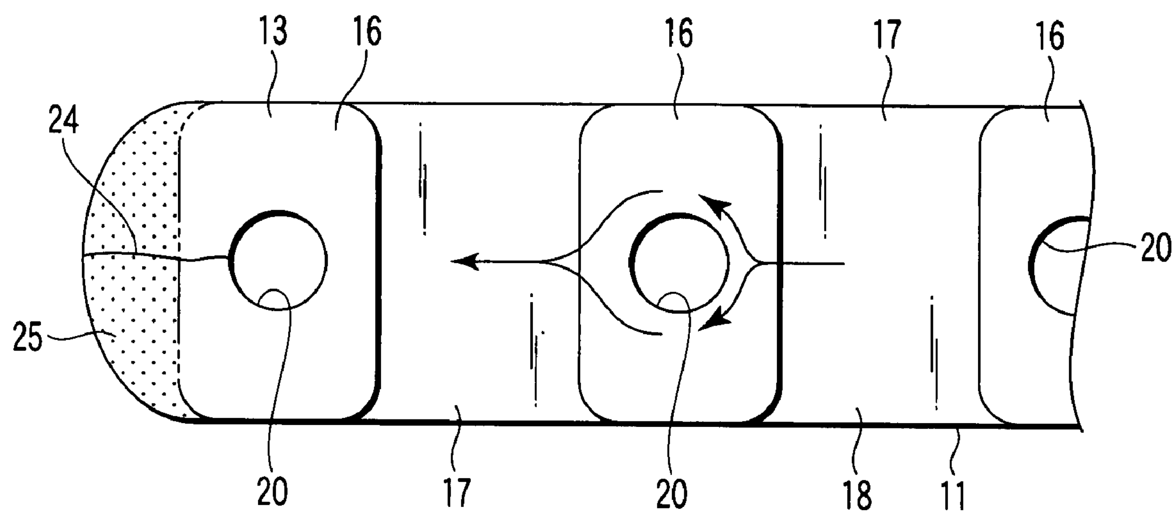
FIG. 7 is an exemplary plan view showing a second end portion of the anti-topping band of the embodiment.

As a result, it is possible that a weld 24, which shows the converging position of the thermoplastic resin material as shown in FIG. 7, is formed in the second end portion 13 of the band main body 11. The weld 24 extends from the through-hole 20 located in the second end portion 13 towards the downstream side along the flowing direction of the resin material. When the weld 24 is thus created, it is possible that the band main body 11 is broken, for example, when the screw 22 is put through the through-hole 20 located in the second end portion 13 and the second end portion 13 is fastened to the television base 4 with the screw 22.

As a solution to this drawback, a reinforcing portion 25 is integrated to the second end portion 13 of the band main body 11 such as to project therefrom in an arc shape along the flowing direction of the thermoplastic resin material. Due to the presence of the reinforcing portion 25, the form of the first portion 16 located at the second end portion 13 is expanded along the flowing direction of the thermoplastic resin material. Therefore, the length from the tip end of the second end portion 13 to the respective through-hole 20 is increased.

In this manner, the second end portion 13 that contains the weld 24 can be reinforced with the reinforcing portion 25. Thus, when the second end portion 13 is fixed to the television base 4 with the screw 22, it is possible to prevent the breakage of the second end portion 13.

According to the anti-toppling band 10 of this embodiment, the ratio in cross sectional area between each first portion 16 where a respective through-hole 20 is located and each respective second portion 17 located between adjacent pair of through holes 20 is 1:1, and thus the ratio in cross sectional area between each first portion 16 and each respective second portion 17 is proper.

With the above-described ratio, even in the case where a tensile load is applied to the band main body 11 as the anti-toppling band 10 is drawn in the longitudinal direction between the liquid crystal television 1 and the television base 4, the stress is not easily concentrated to the first portions 16 where the through-holes 20 are opened. Therefore, the mechanical resistance of the anti-toppling band 10 to breakage is increased, and the life of the band 10 becomes longer.

In addition, as the ratio in cross sectional area of the band main body 11 is made proper, it is possible to prevent the second portion 17 from becoming excessively thick. Further, the pitch P of the through-holes 20 is larger than the width W of the band main body 11, the flexibility of the band main body 11 can be increased while maintaining the strength of the band main body 11. Therefore, the anti-toppling band 10 can be easily and freely bent into various shapes, and thus the operability of the anti-toppling band 10 becomes high.

Furthermore, since the thickness of the second portions 17 of the band main body 11 is not excessively increased, the waste of the thermoplastic resin material can be prevented. In this manner, the increase in the production cost of the anti-toppling band 10 can be suppressed as much as possible.

It should be noted that the display apparatus according to the present invention is not limited to the liquid crystal television, but it may be alternatively a plasma television, or the monitor device for a desktop computer, for example.

Further, the material of the band main body is not limited to nylon. In place of nylon, some other resin material such as polypropylene can be used.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An anti-toppling band comprising:

a flexible band main body including a plurality of through holes formed therein, through which a fixing tool is inserted, wherein:

the through holes are arranged at regular intervals in a longitudinal direction of the band main body;

the band main body includes a plurality of first portions in which the through holes are formed, and a plurality of second portions each interposed between a corresponding pair of adjacent ones of the through holes;

the plurality of first portions and the plurality of second portions are arranged alternately in the longitudinal direction of the band main body;

a cross section area of each of the first portions taken along a width direction of the band main body, is equal to a cross section area of each of the second portions taken along the width direction of the band main body; and the band main body further includes a surface having the first portions and the second portions and a reverse surface located opposite to the surface, the surface of the band main body including projections and recesses in boundary sections between the first portions and the second portions, and the reverse surface of the band main body being flat.

2. The anti-toppling band according to claim 1, wherein a thickness of the plurality of first portions of the band main body is larger than a thickness of the plurality of second portions of the band main body.

3. The anti-toppling band according to claim 1, wherein a length of the plurality of second portions in the longitudinal direction of the band main body is larger than a length of the plurality of first portions in the longitudinal direction of the band main body.

4. The anti-toppling band according to claim 1, wherein the band main body includes a mark that indicates a position of a particular one of the through-hole portions.

5. The anti-toppling band according to claim 1, wherein the band main body is a molded matter obtained from a molten material filled in a mold, the molten material is filled into the mold from a longitudinal end of the band main body to another end, one of the plurality of first portions is located at a downstream end in a flow direction of the molten material, and the first portion located at the downstream end includes a reinforcing portion extending from the first portion along the flow direction of the molten material.

6. An anti-toppling band comprising:

a flexible band main body, wherein the band main body includes a plurality of first portions each having a through hole formed therein through which a fixing tool is put, and a plurality of second portions having a thickness smaller than that of the plurality of first portions, the plurality of first portions and the plurality of second portions are arranged alternately in a longitudinal direction of the band main body, a ratio of a cross section area of each of the first portions of the band main body taken along a width direction of the band main body, to a cross section area of each of the second portions of the band main body taken along the width direction of the band main body, is one to one, and the band main body further includes a surface having the first portions and the second portions and a reverse surface located opposite to the surface, the surface of the band main body including projections and recesses in boundary sections between the first portions and the second portions, and the reverse surface of the band main body being flat.

7. The anti-toppling band according to claim 6, wherein a length of the plurality of second portions in the longitudinal direction of the band main body is larger than a length of the plurality of first portions in the longitudinal direction of the band main body.

8. The anti-toppling band according to claim 6, wherein the band main body includes a mark that indicates a position of a particular one of the through-holes.

9. A display apparatus comprising:

a stand that supports a display main body and is placed on an installation member; and an anti-toppling band provided over between the stand and the installation member, which prevents the display main body from toppling over, wherein the anti-toppling band includes a plurality of through holes formed therein, through which a fixing tool is inserted;

the through holes are arranged at regular intervals in a longitudinal direction of the band main body;

the band main body includes a plurality of first portions in which the through holes are formed, and a plurality of second portions each interposed between a corresponding pair of adjacent ones of the through holes;

the plurality of first portions and the plurality of second portions are arranged alternately in the longitudinal direction of the band main body;

a cross section area of each of the first portions of the band main body taken along a width direction of the band main body, is equal to a cross section area of each of the second portions of the band main body taken along the width direction of the band main body; and the band main body further includes a surface having the first portions and the second portions and a reverse surface located opposite to the surface, the surface of the band main body including projections and recesses in boundary sections between the first portions and the second portions, and the reverse surface of the band main body being flat.

10. The display apparatus according to claim 9, wherein the band main body includes a first end portion located at an end in a longitudinal direction of the band main body, a second end portion located at another end in a longitudinal direction of the main body and a middle portion located between the first end portion and the second end portion, the fixing tool is put through a particular one of the plurality of through-hole portions, which is displaced in a direction of the second end portion of the band main body from the middle portion of the band main body, and the band main body is fixed to the stand via the fixing tool.

11. The anti-toppling band according to claim 10, wherein the band main body includes a mark that indicates a position of the particular one of the through-hole portions.

* * * * *